US012064864B2

(12) United States Patent
Herritz

(10) Patent No.: US 12,064,864 B2
(45) Date of Patent: Aug. 20, 2024

(54) SOCKET HOLDER

(71) Applicant: Milwaukee Electric Tool Corporation, Brookfield, WI (US)

(72) Inventor: Devin W. Herritz, Sussex, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 45 days.

(21) Appl. No.: 17/871,227

(22) Filed: Jul. 22, 2022

(65) Prior Publication Data

US 2023/0020327 A1 Jan. 19, 2023

Related U.S. Application Data

(63) Continuation of application No. PCT/US2022/036356, filed on Jul. 7, 2022.

(60) Provisional application No. 63/220,294, filed on Jul. 9, 2021.

(51) Int. Cl.
*B25H 3/04* (2006.01)

(52) U.S. Cl.
CPC .................................... *B25H 3/04* (2013.01)

(58) Field of Classification Search
CPC ....... B25B 13/06; B25B 13/065; B25B 13/56; B25H 3/04; B25H 3/003; B25H 3/06
See application file for complete search history.

(56) References Cited

U.S. PATENT DOCUMENTS

| | | | |
|---|---|---|---|
| 2,878,701 | A | 3/1959 | Weersma |
| 3,337,058 | A | 8/1967 | Sandrick |
| 4,787,278 | A | 11/1988 | Bononi |
| 4,982,632 | A | 1/1991 | Barmore |
| 5,105,690 | A | 4/1992 | Lazzara et al. |
| 5,207,132 | A | 5/1993 | Goss et al. |
| 5,279,190 | A | 1/1994 | Goss et al. |
| 5,343,786 | A | 9/1994 | Wridt |
| 5,485,769 | A | 1/1996 | Olson et al. |
| 5,520,075 | A | 5/1996 | Barmore |
| 5,568,757 | A | 10/1996 | Lewis |
| 5,592,861 | A | 1/1997 | Barmore |
| 5,725,107 | A | 3/1998 | Dembicks |
| 6,092,655 | A | 7/2000 | Ernst |
| 6,382,057 | B1 | 5/2002 | Kienholz |
| 6,450,338 | B1 | 9/2002 | Chen |
| 6,550,358 | B1 | 4/2003 | Martin |

(Continued)

FOREIGN PATENT DOCUMENTS

| | | |
|---|---|---|
| DE | 19955409 | 5/2006 |
| DE | 102007056740 | 12/2015 |

(Continued)

OTHER PUBLICATIONS

International Search Report and Written Opinion for International Application No. PCT/US2022/036356 dated Oct. 21, 2022, 11 pages.

*Primary Examiner* — Patrick D Hawn
(74) *Attorney, Agent, or Firm* — Reinhart Boerner Van Deuren s.c.

(57) ABSTRACT

Various socket holder designs are shown. The socket holder includes a body portion formed from a first material and a collar portion formed from a second material. The collar includes a base portion with an outer surface positioned to engage with an inner surface of a socket, keeping the socket positioned on the socket holder.

20 Claims, 20 Drawing Sheets

(56) References Cited

U.S. PATENT DOCUMENTS

| | | | | |
|---|---|---|---|---|
| 6,712,225 | B2 | 3/2004 | McNeely | |
| 6,854,607 | B2 * | 2/2005 | Tong | A47F 5/0838 206/378 |
| 6,860,489 | B2 | 3/2005 | Chen | |
| 7,077,037 | B2 | 7/2006 | Shevela et al. | |
| 7,096,765 | B1 | 8/2006 | Diggle, III et al. | |
| 7,114,418 | B1 | 10/2006 | Allen | |
| 7,118,406 | B2 | 10/2006 | Mu et al. | |
| 7,194,935 | B1 | 3/2007 | Li | |
| 7,264,213 | B2 * | 9/2007 | Liu | B65D 73/0064 248/314 |
| 7,281,310 | B2 | 10/2007 | Moore et al. | |
| 7,448,300 | B2 | 11/2008 | Barniak, Jr. | |
| 7,658,284 | B2 | 2/2010 | Lin | |
| 7,753,216 | B2 | 7/2010 | Kao | |
| 7,841,480 | B2 * | 11/2010 | Hsieh | B25H 3/06 403/328 |
| 7,931,159 | B2 | 4/2011 | Kao | |
| 8,096,516 | B2 * | 1/2012 | Shiao | B25H 3/04 211/70.6 |
| 8,381,905 | B1 * | 2/2013 | Kao | B25H 3/003 206/378 |
| 8,770,418 | B2 | 7/2014 | Ernst | |
| 8,956,236 | B2 | 2/2015 | Chu | |
| 9,051,103 | B2 | 6/2015 | Chiang | |
| 9,138,890 | B2 | 9/2015 | Lee | |
| 9,144,893 | B2 | 9/2015 | Su | |
| 9,247,832 | B2 | 2/2016 | Chang | |
| 9,321,158 | B2 | 4/2016 | Calvert | |
| 9,375,829 | B2 | 6/2016 | Su | |
| D776,505 | S | 1/2017 | Doroslovac | |
| 9,604,771 | B1 | 3/2017 | Chen | |
| D784,106 | S | 4/2017 | Doroslovac | |
| 9,687,968 | B2 | 6/2017 | Doroslovac et al. | |
| D794,405 | S | 8/2017 | Doroslovac et al. | |
| D798,682 | S | 10/2017 | Doroslovac et al. | |
| 9,782,890 | B2 * | 10/2017 | Hsieh | B25H 3/04 |
| 9,827,654 | B2 | 11/2017 | Su | |
| 9,873,195 | B1 * | 1/2018 | Buxton | B25H 3/003 |
| 9,925,657 | B1 | 3/2018 | Kao | |
| 9,943,947 | B2 | 4/2018 | Tseng | |
| 9,956,681 | B2 | 5/2018 | Kao | |
| 10,016,889 | B2 | 7/2018 | Kao | |
| 10,029,352 | B2 | 7/2018 | Yang | |
| D829,069 | S | 9/2018 | Doroslovac et al. | |
| 10,065,295 | B2 | 9/2018 | Su | |
| 10,081,094 | B2 | 9/2018 | Doroslovac et al. | |
| 10,315,819 | B2 | 6/2019 | Jhu et al. | |
| D859,944 | S | 9/2019 | Kukucka et al. | |
| D859,945 | S | 9/2019 | Kukucka et al. | |
| D859,946 | S | 9/2019 | Kukucka et al. | |
| D859,947 | S | 9/2019 | Kukucka et al. | |
| 10,421,175 | B2 * | 9/2019 | Chou | B25H 3/04 |
| 10,427,278 | B2 | 10/2019 | Su | |
| D867,841 | S | 11/2019 | Kukucka et al. | |
| D868,553 | S | 12/2019 | Kukucka et al. | |
| D879,577 | S | 3/2020 | Kukucka et al. | |
| D880,968 | S | 4/2020 | Kukucka et al. | |
| 10,625,404 | B2 | 4/2020 | Chu | |
| 10,632,606 | B1 * | 4/2020 | Wang | B25H 3/006 |
| D885,149 | S | 5/2020 | Kukucka et al. | |
| D887,233 | S | 6/2020 | Kukucka et al. | |
| D889,257 | S | 7/2020 | Kukucka et al. | |
| 10,906,714 | B2 | 2/2021 | Chen | |
| 10,919,142 | B2 * | 2/2021 | Hsieh | B25H 3/04 |
| 11,090,799 | B2 * | 8/2021 | Wang | B25H 3/003 |
| 11,091,778 | B2 * | 8/2021 | Winnard | A61K 39/215 |
| 11,253,988 | B1 * | 2/2022 | Hsieh | B25H 3/04 |
| 2005/0102793 | A1 | 5/2005 | Shih | |
| 2006/0219647 | A1 | 10/2006 | Shih | |
| 2006/0254940 | A1 | 11/2006 | Mu et al. | |
| 2008/0028893 | A1 | 2/2008 | Moore et al. | |
| 2008/0047911 | A1 | 2/2008 | Kao | |
| 2009/0211407 | A1 | 8/2009 | Collier | |
| 2009/0266956 | A1 | 10/2009 | Shih | |
| 2013/0186243 | A1 * | 7/2013 | Harper | B25B 23/0035 29/446 |
| 2014/0209780 | A1 | 7/2014 | Chang | |
| 2014/0305824 | A1 * | 10/2014 | Hsieh | B25H 3/04 206/378 |
| 2015/0034514 | A1 | 2/2015 | Chiang | |
| 2015/0314429 | A1 | 11/2015 | Doroslovac | |
| 2015/0335368 | A1 | 11/2015 | Auger et al. | |
| 2016/0193723 | A1 | 7/2016 | Su | |
| 2016/0221162 | A1 | 8/2016 | Sun | |
| 2017/0252905 | A1 | 9/2017 | Doroslovac et al. | |
| 2018/0015596 | A1 | 1/2018 | Kim | |
| 2018/0147698 | A1 | 5/2018 | Doroslovac et al. | |
| 2018/0354102 | A1 | 12/2018 | Kukucka et al. | |
| 2018/0354103 | A1 | 12/2018 | Doroslovac et al. | |
| 2019/0015961 | A1 | 1/2019 | Kukucka et al. | |
| 2019/0152033 | A1 | 5/2019 | Kukucka et al. | |
| 2019/0209219 | A1 | 7/2019 | Auger et al. | |
| 2019/0337131 | A1 | 11/2019 | Kukucka et al. | |
| 2019/0375077 | A1 | 12/2019 | Kukucka et al. | |
| 2020/0039034 | A1 | 2/2020 | Kukucka et al. | |
| 2020/0130155 | A1 | 4/2020 | Donner | |
| 2021/0060761 | A1 | 3/2021 | Chang | |

FOREIGN PATENT DOCUMENTS

| | | |
|---|---|---|
| EP | 1655112 | 8/2007 |
| WO | WO9635552 | 11/1996 |
| WO | WO9817440 | 4/1998 |
| WO | WO15162136 | 10/2015 |
| WO | WO19007726 | 1/2019 |

* cited by examiner

SOCKET HOLDER

CROSS-REFERENCE TO RELATED PATENT APPLICATION

The present application is a continuation of International Application No. PCT/US2022/036356, filed Jul. 7, 2022, which claims the benefit of and priority to U.S. Provisional Application No. 63/220,294, filed on Jul. 9, 2021, which are incorporated herein by reference in their entireties.

BACKGROUND OF THE INVENTION

The present invention relates generally to the field of tool storage. The present invention relates specifically to various socket holders or storage attachment devices designed to better retain or hold a socket on the storage attachment device.

SUMMARY OF THE INVENTION

One embodiment of the invention relates to a socket holder including a body portion and a collar. The body portion includes a base component, a neck, a pair of side components, a head, and a pair of protrusions. The base component includes first and second opposing ends. The neck is coupled to and extends away from an upper side of the base component. Each one of the pair of side components is coupled to one of the first and second opposing ends of the base component, respectively. The pair of side components extend away from the lower side of the base component in a direction opposite of the neck. The head is coupled to an upper end of the neck and a longitudinal axis extends through the head. Each one of the pair of protrusions extend inward from a lower end of the one of the side components toward the longitudinal axis. The collar includes a generally horizontal disc and a generally vertical wall that extends away from the generally horizontal disc in a direction parallel to the longitudinal axis. The collar is a separate component, non-integral with the body and positioned around at least a portion of the head of the body portion such that portions of the generally horizontal disc protrude outward away from the head and are configured to engage with an inner surface of a socket such that the socket is held on the socket holder.

Another embodiment of the invention relates to a socket holder including a body portion and a collar. The body portion includes a rail engagement base, a neck coupled to and extending away from the rail engagement base and a head coupled to the neck. A longitudinal axis extends through the head. The collar includes a generally horizontal disc and a generally vertical wall that extends away from the generally horizontal disc in a direction parallel to the longitudinal axis. The body portion is formed from a first material and the collar is formed from a second material different from the first material.

Another embodiment of the invention relates to a socket holder including a body and a collar. The body includes a base component, a neck, a pair of side components, a head, and a pair of protrusions. The neck is coupled to and extends away from the base component. The pair of side components are coupled to the base component and extend away from the base component in a direction opposite of the neck. The head is coupled to the neck and a longitudinal axis extends through the head. Each of the pair of protrusions extend inward from one of the side components toward the longitudinal axis. The collar includes a generally horizontal disc and a generally vertical wall. The generally horizontal disc includes a lower body region, an upper body region and a main retention ring positioned between the lower body region and the upper body region. The main retention ring includes an outer surface. The generally vertical wall extends away from the generally horizontal disc in a direction parallel to the longitudinal axis.

Another embodiment of the invention relates to a socket holder including a body portion formed from a first material and a collar portion formed from a second material different from the first material. The second material has a property (e.g., durometer, elasticity, surface friction etc.) different than the property of the first material. In specific embodiments, the first material is a polymer material having a first durometer, and the second material is a polymer material having a second durometer less than the first durometer. The body includes a neck, a base component, a pair of side components, a pair of protrusions and a head portion. The collar includes a generally horizontal disc having an outer surface and a generally vertical wall extending away from the generally horizontal disc in a direction parallel to an axis extending through a center of the body and head portion. The collar is positioned such that the outer surface of the generally horizontal disc engages with an inner surface of a socket such that the socket is held on the socket holder. The head portion of the body includes an outer surface defining a first outer diameter. The outer surface of the generally horizontal disc defines a second outer diameter different from the first outer diameter.

Another embodiment of the invention relates to a socket holder including a body portion formed from a first material and a collar portion formed from a second material. The first material having a greater hardness than the second material. The body includes a neck, a base component, a pair of side components, a pair of protrusions and a head portion. The collar includes a generally horizontal disc having an outer surface and a generally vertical wall extending away from the generally horizontal disc in a direction parallel to an axis extending through a center of the body and head portion. The collar is positioned such that the outer surface of the generally horizontal disc engages with an inner surface of a socket such that the socket is held on the socket holder. The head portion of the body includes an outer surface defining a first outer diameter. The outer surface of the generally horizontal disc defines a second outer diameter that is greater than the first outer diameter.

Another embodiment of the invention relates to a socket holder including a body portion formed from a first material and a collar portion formed from a second material different from the first material. The second material has a property (e.g., durometer, elasticity, surface friction etc.) different than the property of the first material. In specific embodiments, the first material is a polymer material having a first durometer, and the second material is a polymer material having a second durometer less than the first durometer. The body includes a neck, an base component, a pair of side components, a pair of protrusions and a head portion. The collar includes a generally horizontal disc and a generally vertical wall extending away from the generally horizontal disc in a direction parallel to an axis extending through a center of the body and head portion. The generally horizontal disc includes a main retention ring with an outer surface, a lower body region and an upper body region. The main retention ring has a first outer diameter greater than the outer diameters of both the upper body and lower body regions of generally horizontal disc. The collar is positioned such that the outer surface of the main retention ring engages with an inner surface of a socket such that the socket is held on the socket holder. The head portion of the body includes an outer surface defining a second outer diameter. The first outer diameter of the main retention ring is different from the second outer diameter of the head. The generally horizontal disc includes a thickness and the main retention ring includes a thickness. The thickness of the main retention ring is at least 50% of an outward facing surface material of the generally horizontal disc.

Another embodiment of the invention relates to a socket holder including a body portion formed from a first material and a collar portion formed from a second material. The first material having a greater hardness than the second material. The body includes a neck, a base component, a pair of side components, a pair of protrusions and a head portion. The collar includes a generally horizontal disc and a generally vertical wall extending away from the generally horizontal disc in a direction parallel to an axis extending through the a center of the body and head portion. The generally horizontal disc includes a main retention ring with an outer surface, a lower body region and an upper body region. The main retention ring has a first outer diameter greater than the outer diameters of both the upper body and lower body regions of the generally horizontal disc. The collar is positioned such that the outer surface of the main retention ring engages with an inner surface of a socket such that the socket is held on the socket holder. The head portion of the body includes an outer surface defining a second outer diameter. The first diameter of the main retention ring is greater than the second outer diameter of the head portion. The generally horizontal disc includes a thickness and the main retention ring includes a thickness. The thickness of the main retention ring is at least 30% of an outward facing surface material of the generally horizontal disc.

Another embodiment of the invention relates to a socket holder kit. The socket holder kit includes a plurality of socket holders having various sizes, a plurality of sockets having various sizes, and at least one rail or base component configured to be removably coupled to the socket holders.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a socket holder designed to provide increased engagement between a socket and the socket holder and improved usability are shown. In general, Applicant has determined that by constructing the socket holder having the designs and materials discussed herein and having similar size and/or shape, socket holders can demonstrate improved socket retention and increased durability in terms of socket retention force. Applicant believes this design provides more reliable retention than a single material component socket, such as a live hinge type of detent which may be dimensionally sensitive, leading to inadequate retention or premature cycle failure. Further, a one-piece design for a socket holder allows for easier implementation compared to twopiece socket holders. Specifically, in comparison to standard socket holders that utilize a spring-biased ball detent, the socket holders discussed herein provide even engagement with a substantial portion of the inner diameter of the related socket, providing a secure attachment. In addition, the reduction/elimination of moving parts is believed to provide increased simplicity and durability and allow for manufacturing via efficient molding techniques, rather than through complex assembly steps as is the case with spring-detent socket holders.

Figure 1:
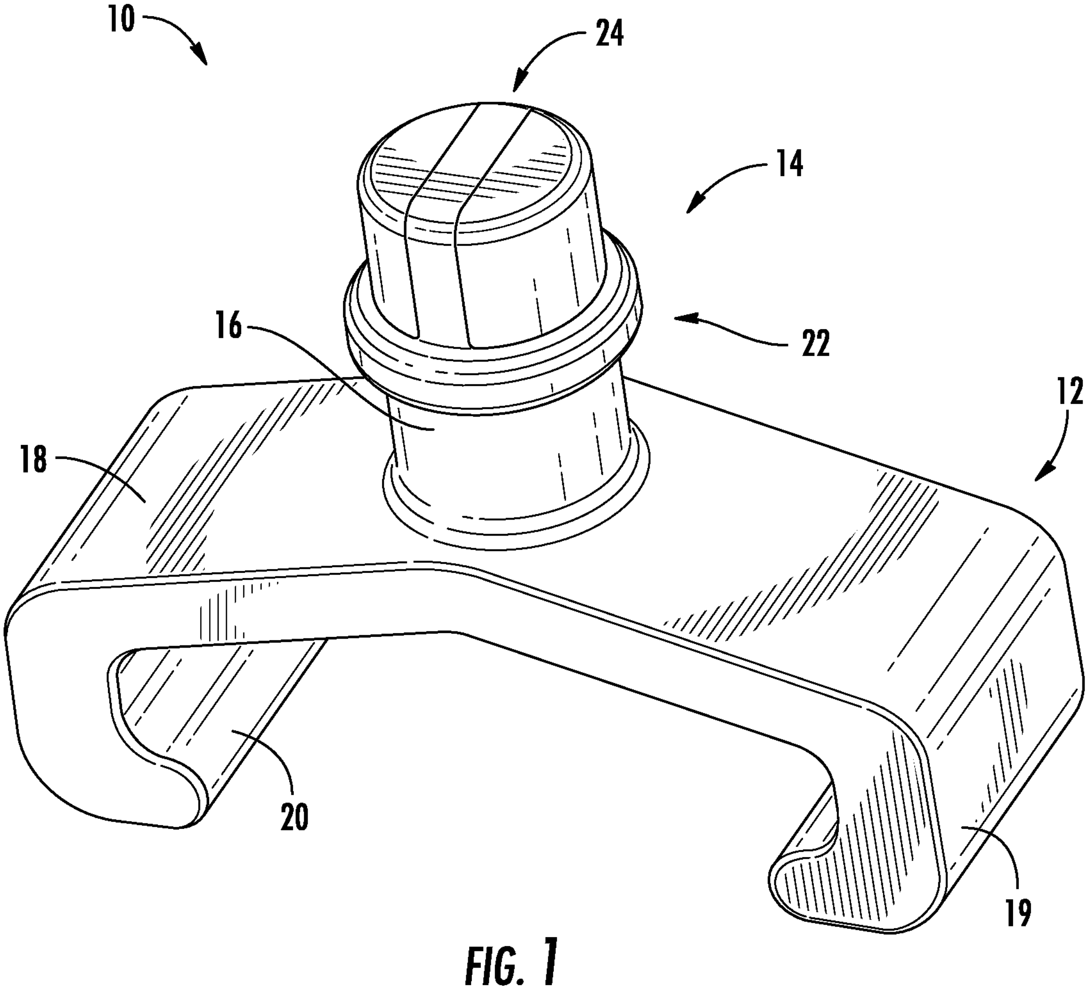
FIG. 1 is a perspective view of a socket holder, according to an exemplary embodiment.
Figure 2:
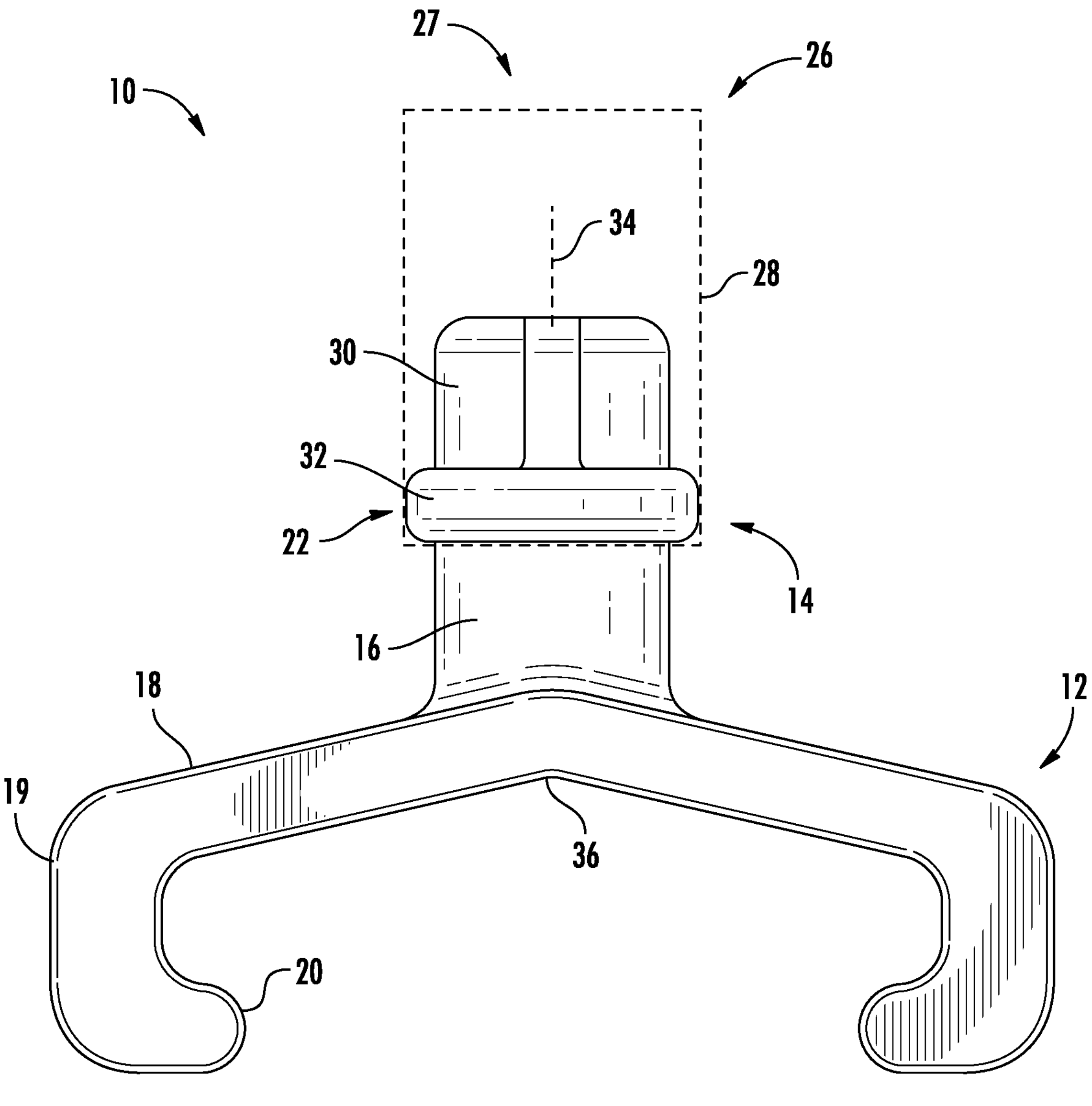
FIG. 2 is a front view of the socket holder of FIG. 1, according to an exemplary embodiment.

Referring to FIGS. 1-2, various aspects of a socket holder, shown as socket holder 10, are shown. Socket holder 10 includes a first portion or body 12 formed from a first material and a second portion or collar 14 formed from a second material different from the first material. The second material has a property (e.g., durometer, elasticity, surface friction etc.) different than the property of the first material. In specific embodiments, the first material is a polymer material having a first durometer, and the second material is a polymer material having a second durometer less than the first durometer. In a specific embodiment, the first portion or body 12 is formed from a relatively hard material, such as a hard polymer material (e.g., polyamide) and the second portion or collar 14 formed from a relatively soft material, such as a soft polymer material (e.g., thermoplastic polyurethane (TPU), rubber, polytetrafluoroethylene (PTFE), nitrile, silicone EPR). In a specific embodiment, the relatively soft material preferably has a Shore A hardness from 45 to 75.

Body 12 includes a neck 16, a base component 18, a pair of side components 19, a pair of protrusions 20 and a head or uppermost portion 30 of the body. Neck 16 is coupled to and extends away from an upper side of the base component. Head 30 is coupled to an upper end of the neck 16.

Base component 18 includes first and second opposing ends. Side components 19 are each coupled to one of the first and second opposing ends of the base component 18, respectively, and extend away from a lower side of the base component 18 in a downward direction (i.e., in a direction opposite of neck 16) represented by arrow 27 before extending inward as protrusions 20 toward an axis 34. Specifically, each one of the protrusions 20 extend inward from a lower end of one of the side components 19. The base component 18 acts as a rail engagement structure (i.e., grasps and/or holds onto a socket rail, tray, etc.). The protrusions 20 are configured to grasp and/or hold the socket holder 10 on a rail, tray and/or base component.

Axis 34 extends from a center groove 36 of body 12 through neck 16 and head 30 of body 12. Collar 14 includes a base portion, shown as a generally horizontal disc 22 (e.g., generally perpendicular to axis 34, 90 degrees±10 degrees) and a generally vertical wall 24 (e.g., generally perpendicular to horizontal disc 22, 90 degrees±10 degrees) extending away from generally horizontal disc 22 in a direction parallel to axis 34. Generally horizontal disc 22 includes an outer surface 32. The collar 14 is a separate component, non-integral with body 12 and positioned around at least a portion of the head 30 of the body 12 such that portions of the generally horizontal disc 22 protrude outward away from the head 30 and are configured to engage with an inner surface of a socket component 26 such that the socket component 26 is held on the socket holder 10.

The socket component 26 is placed onto socket holder 10 in the downward direction of arrow 27. Socket component 26 includes an inner surface 28 that engages with the outer surface 32 of generally horizontal disc 22. The engagement (e.g., via friction) between outer surface 32 of collar 14 and inner surface 28 holds socket component 26 on socket holder 10. Applicant believes that this type of radial engagement around the inner surface of the socket component provides for more secure attachment as compared to spring-ball detent attachment mechanisms.

Figure 3:
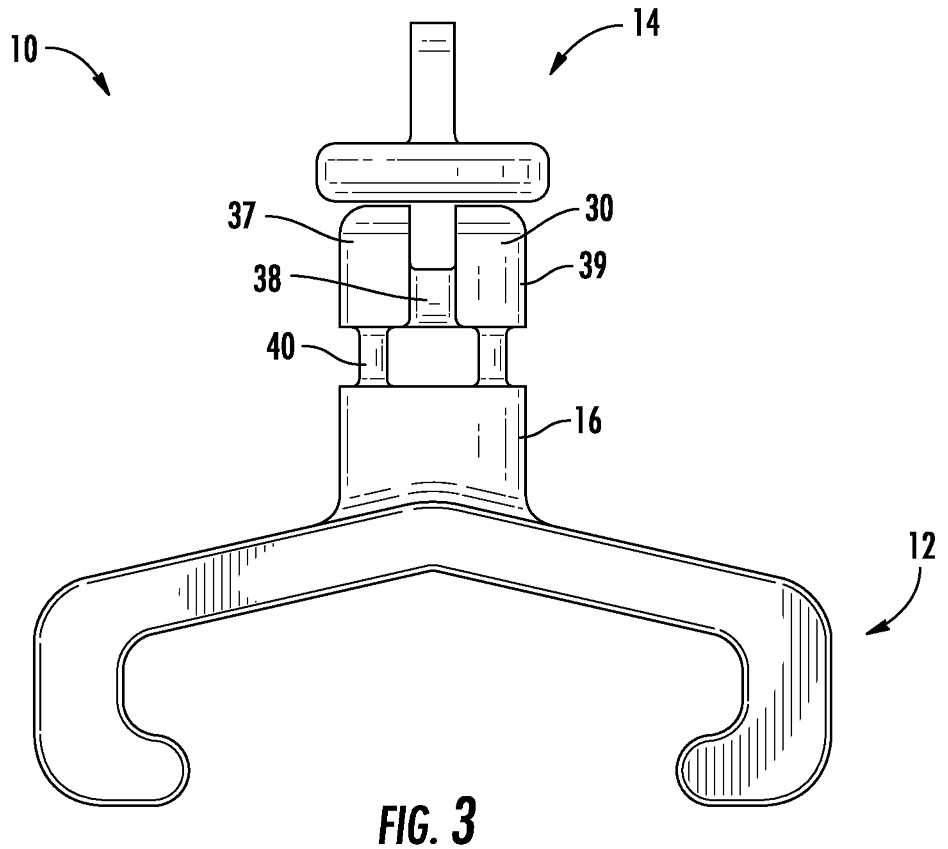
FIG. 3 is an exploded view of the socket holder of FIG. 1, according to an exemplary embodiment.

Referring to FIG. 3, an exploded view of the socket holder 10 is shown according to an exemplary embodiment. Body 12 includes a horizontal connector 38 extending between a first side 37 and a second side 39 of head 30. Body 12 further includes a pair of vertical connectors 40 extending between neck 16 and first side 37 and second side 39 of head 30 respectively.

Figure 4:
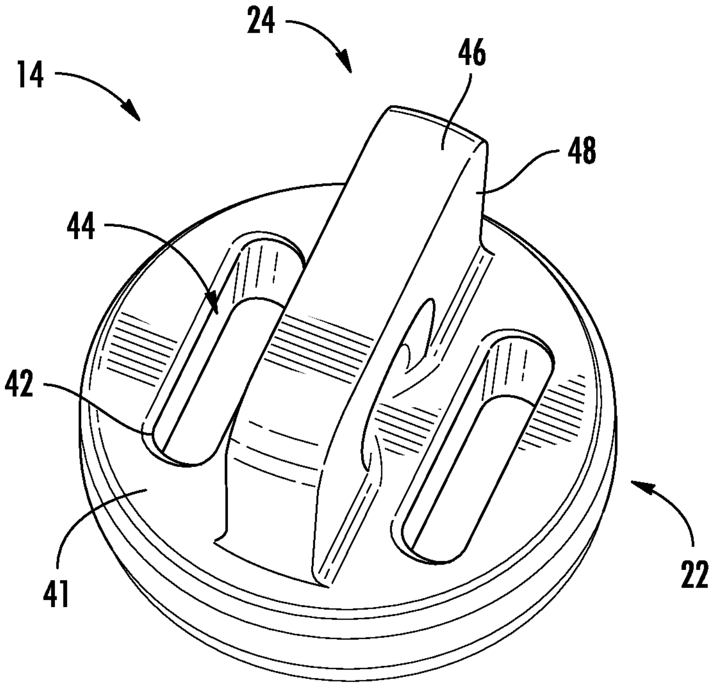
FIG. 4 is a detailed perspective view of a second portion of the socket holder of FIG. 1, according to an exemplary embodiment.
Figure 5:
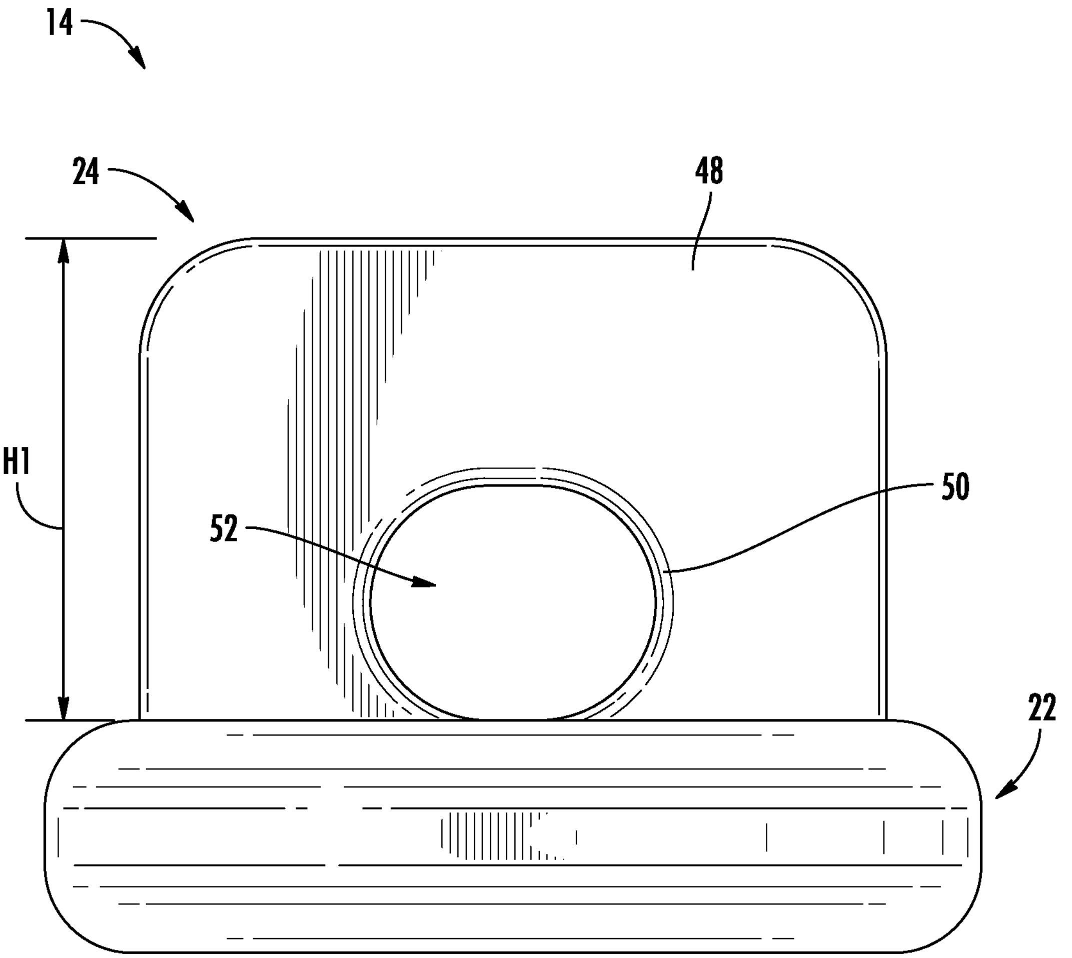
FIG. 5 is a detailed side view of the second portion of the socket holder of FIG. 4, according to an exemplary embodiment.

Referring to FIGS. 4 and 5, a detailed view of second portion or collar 14 according to an exemplary embodiment is shown. Generally horizontal disc 22 further includes an upper surface 41 with an edge 42 defining a first aperture 44. Generally vertical wall 24 further includes an upper or top surface 46 and a pair of generally vertical, side surfaces 48. Side surface 48 includes an edge 50 defining a second aperture 52. In other embodiments, the horizontal and vertical connectors 38, 40 and corresponding first and second apertures 44, 52 may have other shapes (e.g., square, circular etc.). Side surface 48 has a height H1.

Figure 6:
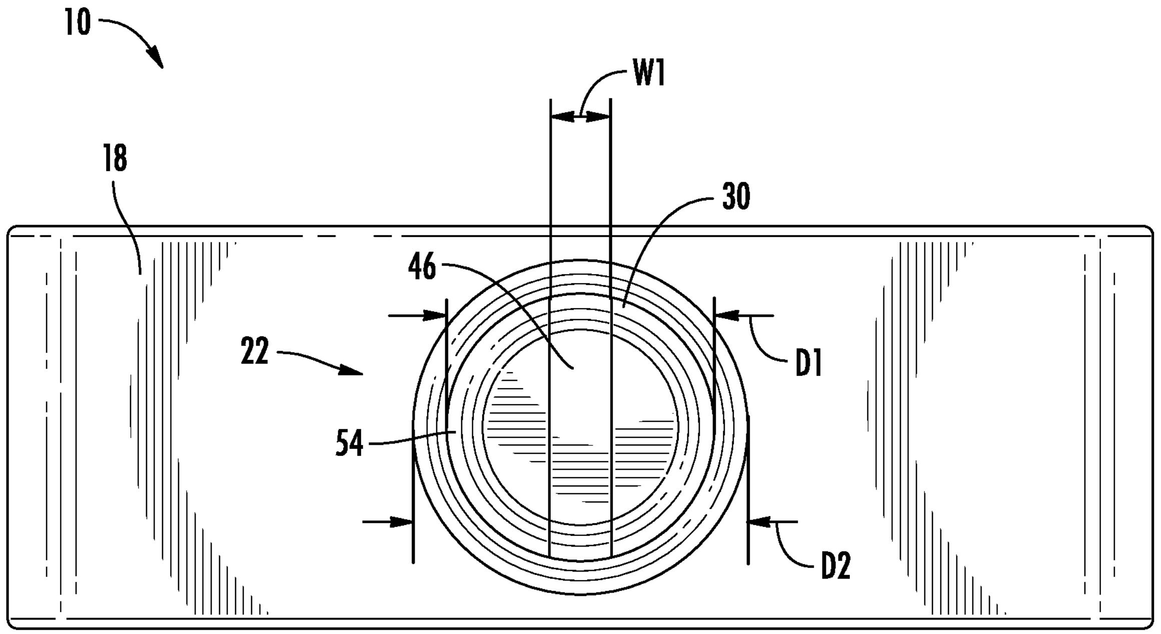
FIG. 6 is a top view of the socket holder of FIG. 1, according to an exemplary embodiment.
Figure 7:
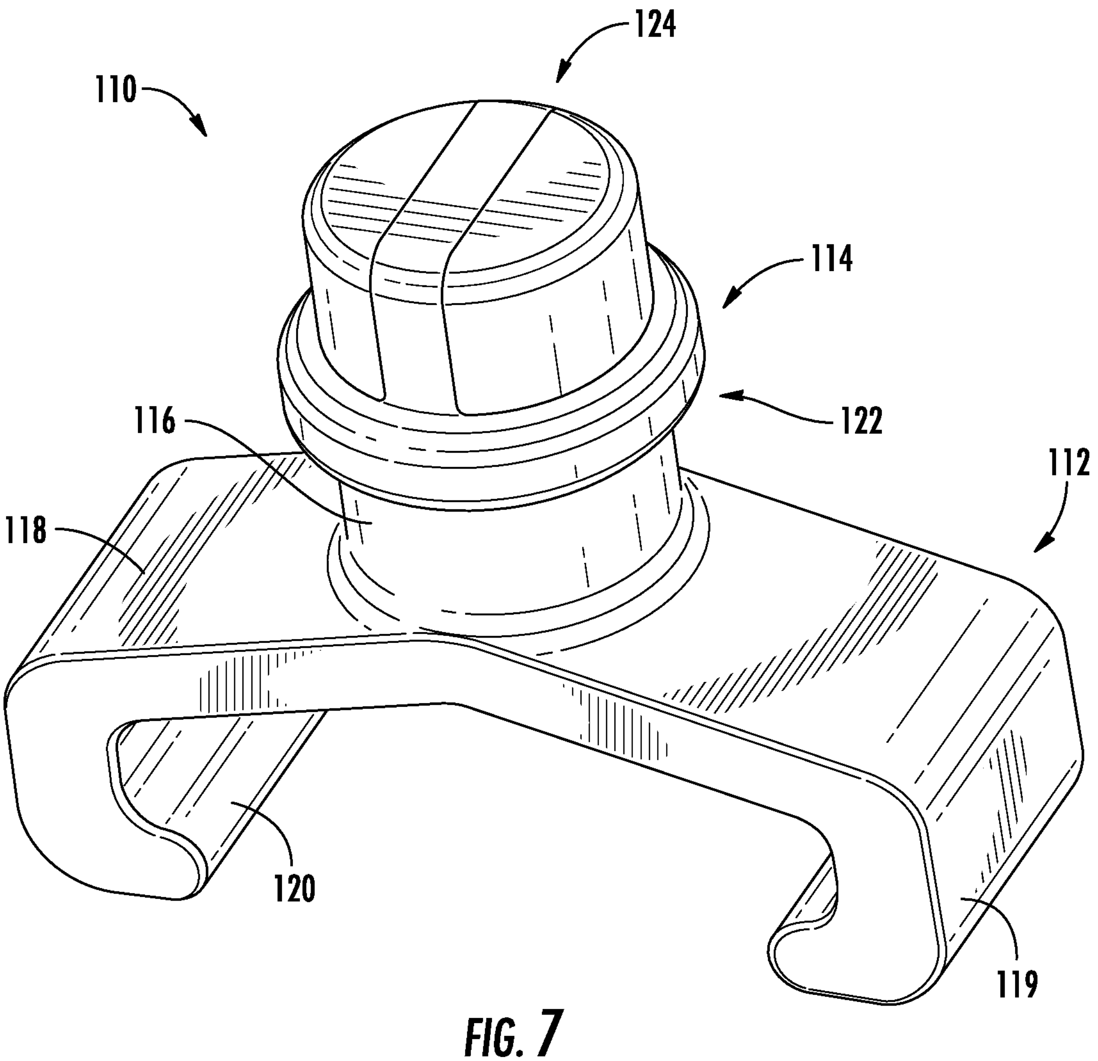
FIG. 7 is a perspective view of a socket holder, according to another exemplary embodiment.
Figure 8:
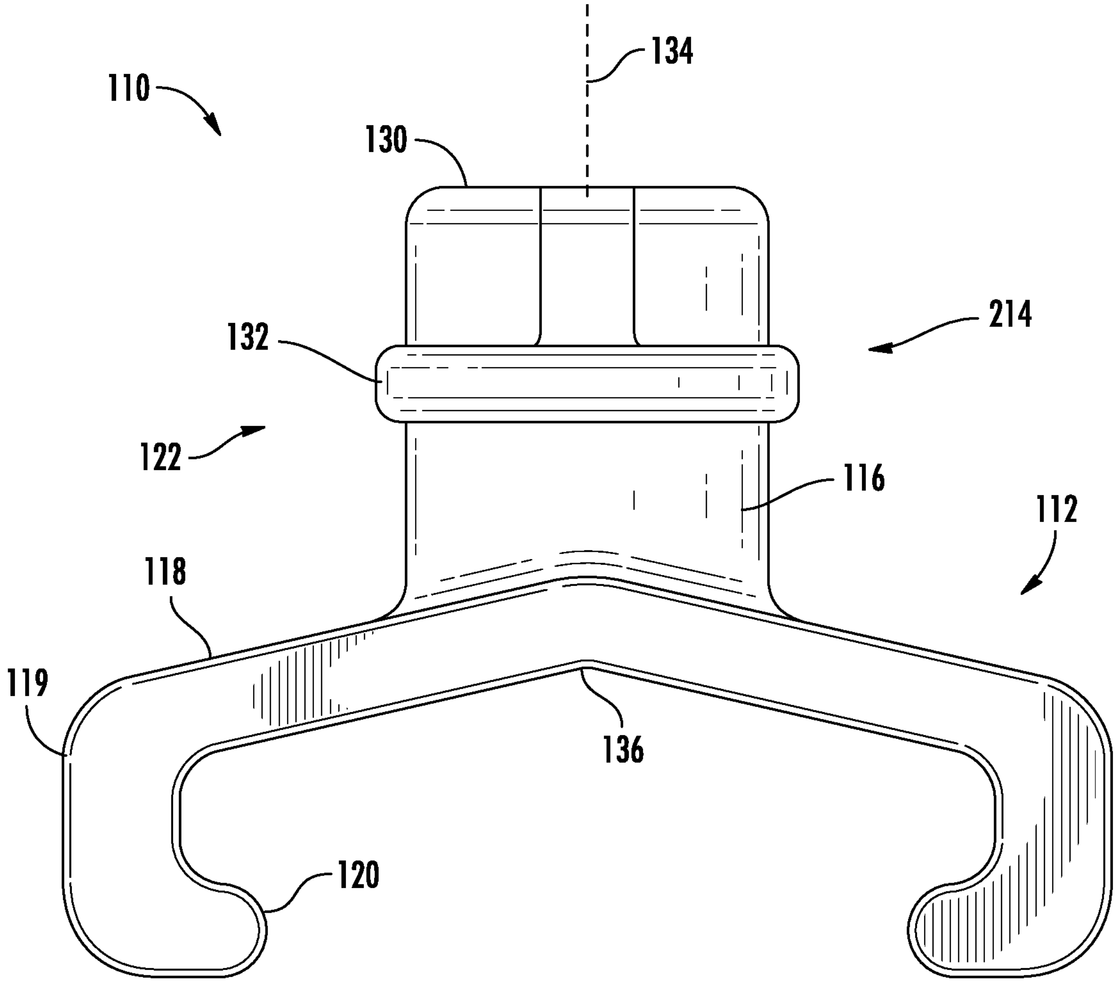
FIG. 8 is a front view of the socket holder of FIG. 7, according to an exemplary embodiment.

Referring to FIG. 6, a top view of socket holder 10 is shown. Upper surface 46 of generally vertical wall 24 has a width W1. In a specific embodiment, W1 is specifically between 30% and 40% of H1, more specifically between 34% and 38% of H1 and in such embodiments W1 is about 0.059 inches (e.g. 0.059 inches plus or minus 0.01 inches). Head 30 further includes an outer surface 54 defining an outer diameter D1. Outer surface 32 of generally horizontal disc 22 defines an outer diameter D2. In various embodiments, D1 is between 70% and 90% of D2, specifically between 75% and 85% of D2 and more specifically between 78% and 82% of D2. In a specific embodiment, D1 is between 79% and 81% of D2 and in such embodiments D2 is about 0.315 in (e.g., 0.315 inches plus or minus 0.0625 inches).

Figure 9:
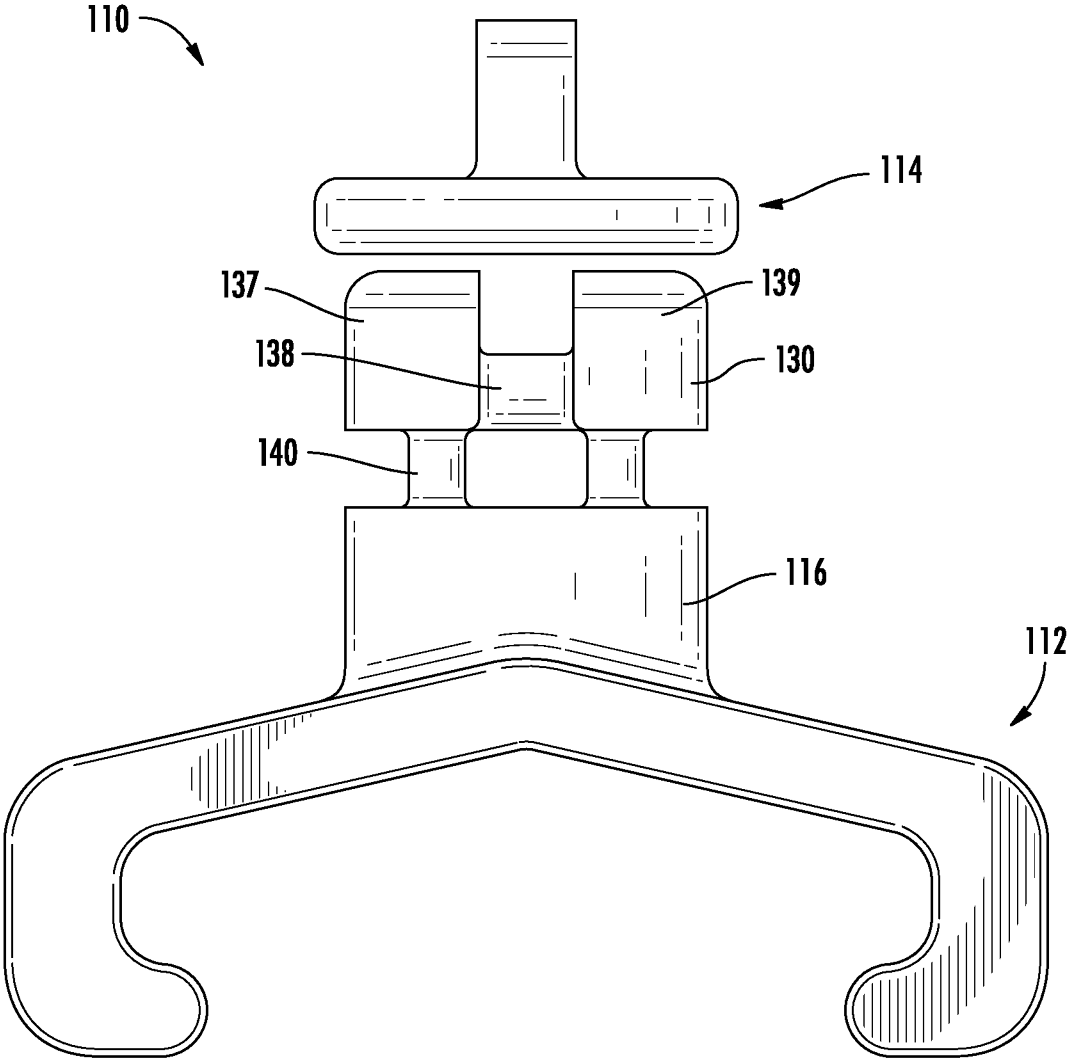
FIG. 9 is an exploded view of the socket holder of FIG. 7, according to an exemplary embodiment.
Figure 10:
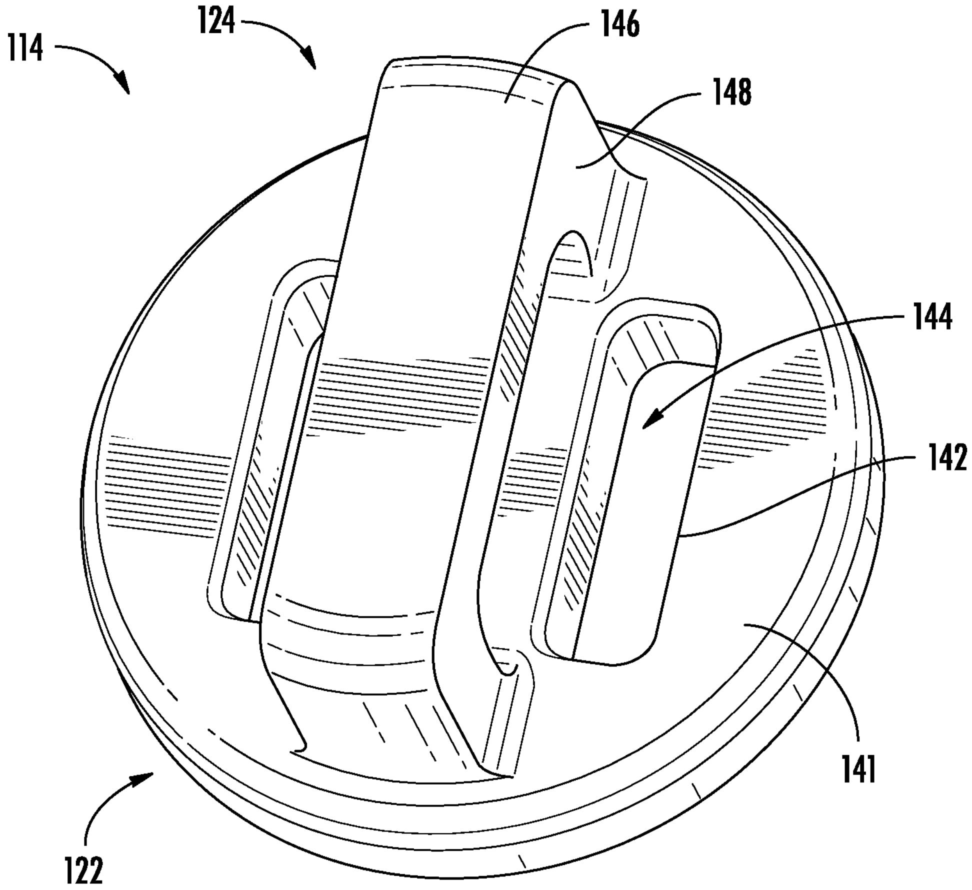
FIG. 10 is a detailed perspective view of a second portion of the socket holder of FIG. 7, according to an exemplary embodiment.
Figure 11:
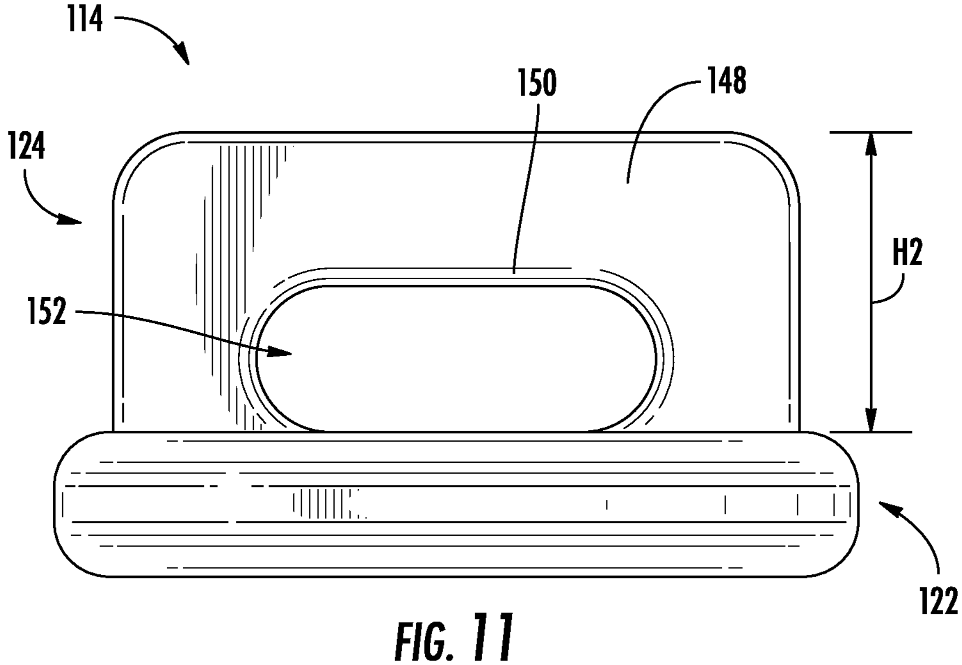
FIG. 11 is a detailed side view of the second portion of the socket holder of FIG. 10, according to an exemplary embodiment.

Referring to FIGS. 7-11, various aspects of a socket holder, shown as a socket holder 110, are shown. In general, socket holder 110 is substantially the same as socket holder 10 except for the differences discussed herein. Referring to FIG. 9, an exploded view of the socket storage holder 110 is shown according to an exemplary embodiment. Body 112 includes a horizontal connector 138 extending between a first side 137 and a second side 139 of a head 130. Body 112 further includes a pair of vertical connectors 140 extending between neck 116 and first side 137 and second side 139 of head 130 respectively. In other embodiments, the horizontal and vertical connectors 138, 140 may have other shapes (e.g., rectangular, circular etc.) or sizes. Referring to FIG. 11, a side surface 148 of a generally vertical wall 124 of collar 114 has a height H2.

Figure 12:
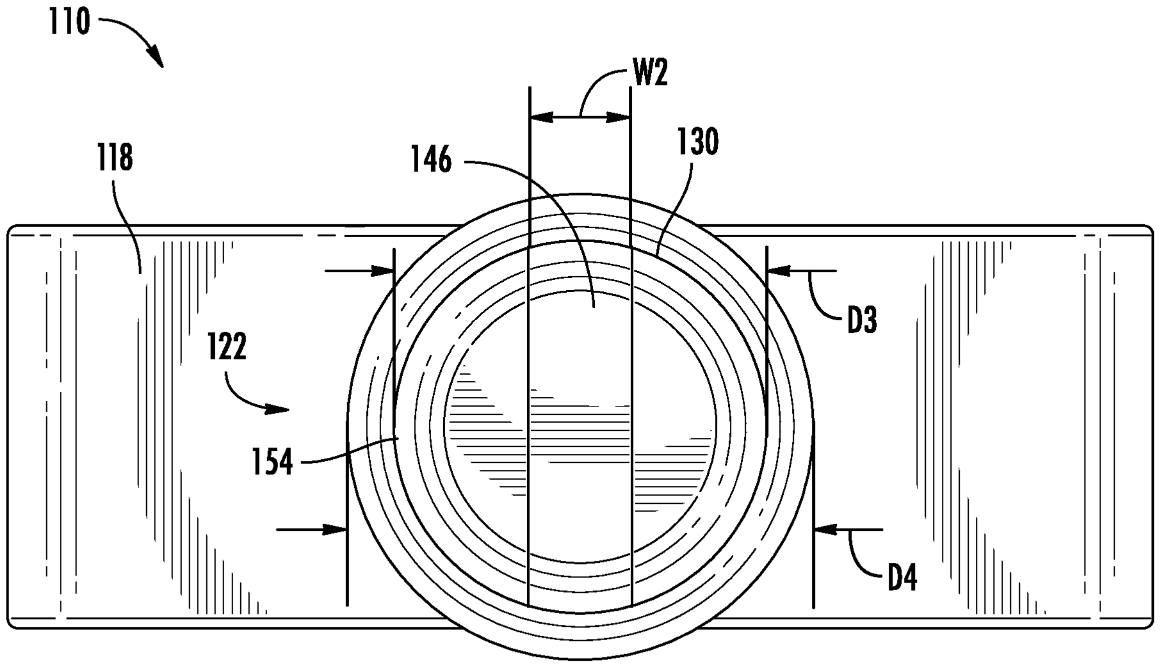
FIG. 12 is a top view of the socket holder of FIG. 7, according to an exemplary embodiment.
Figure 13:
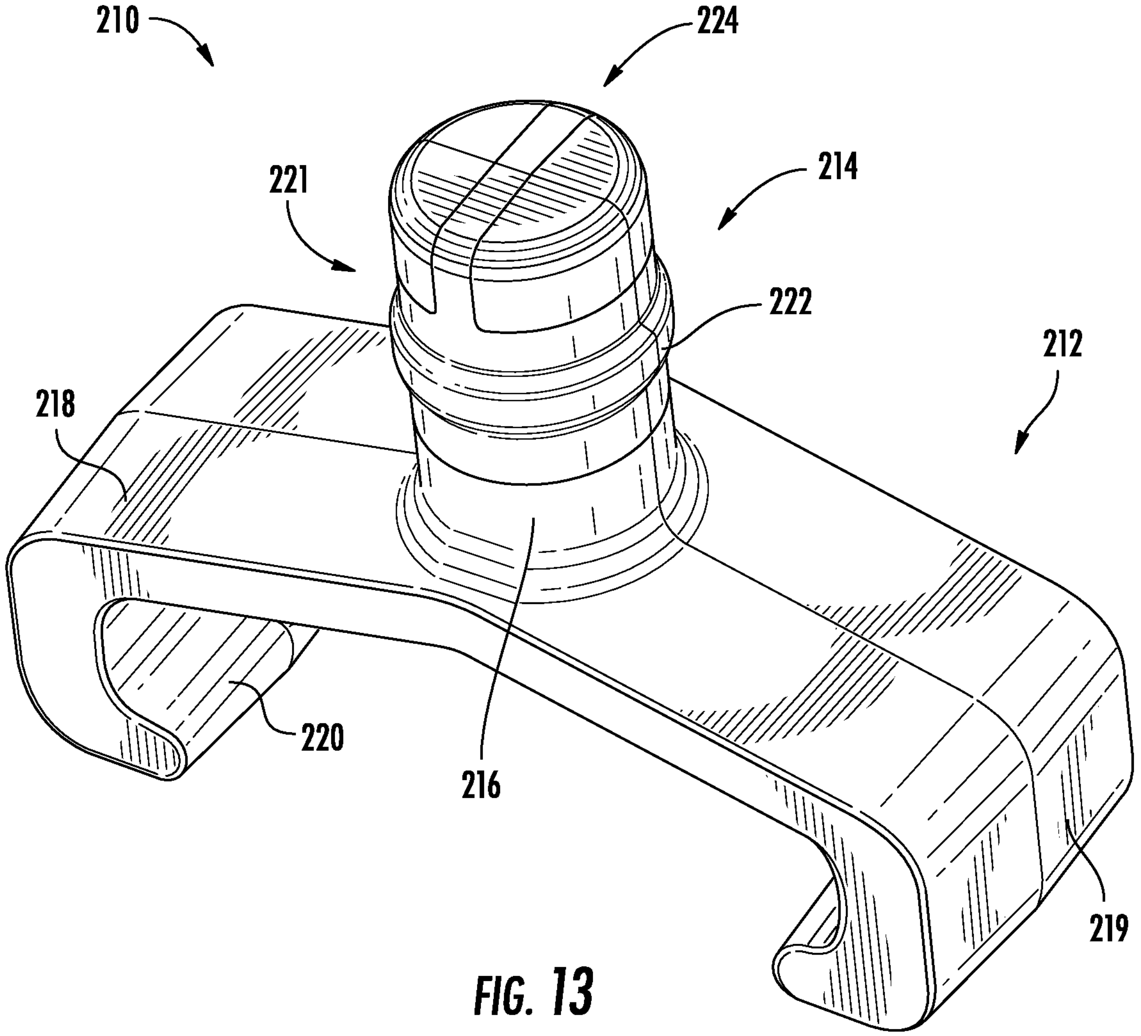
FIG. 13 is a perspective view of a socket holder, according to another exemplary embodiment.
Figure 14:
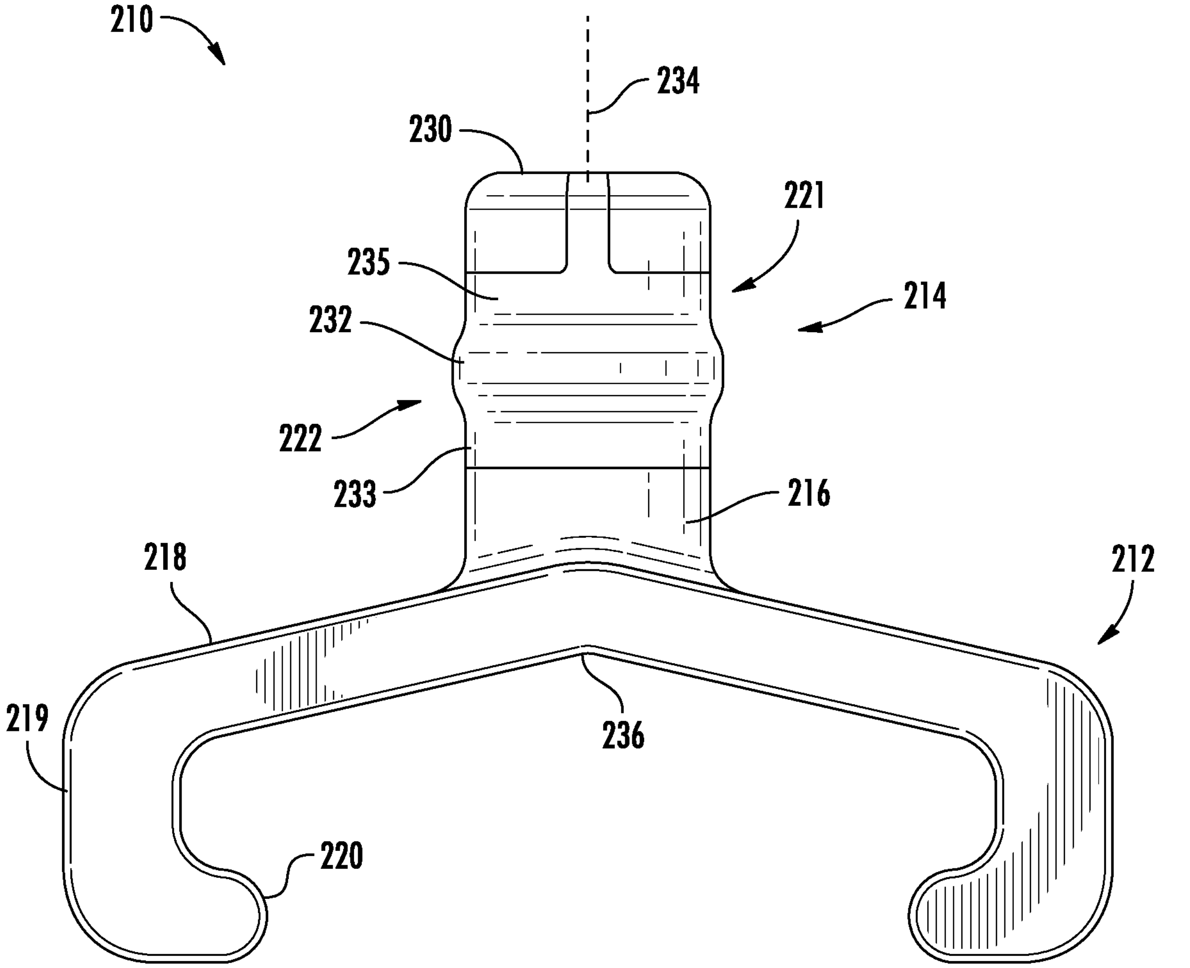
FIG. 14 is a front view of the socket holder of FIG. 13, according to an exemplary embodiment.
Figure 15:
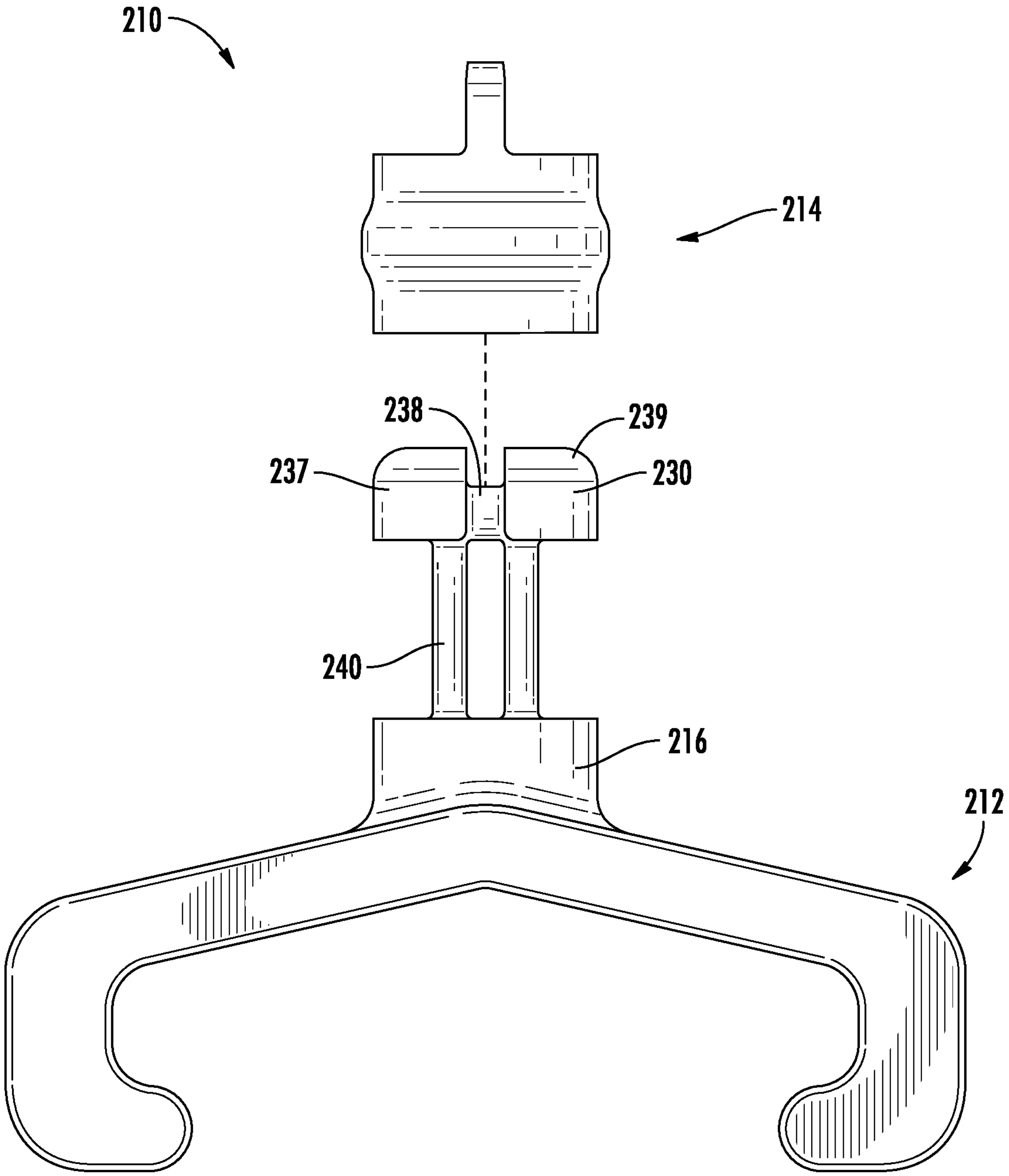
FIG. 15 is an exploded view of the socket holder of FIG. 13, according to an exemplary embodiment.
Figure 16:
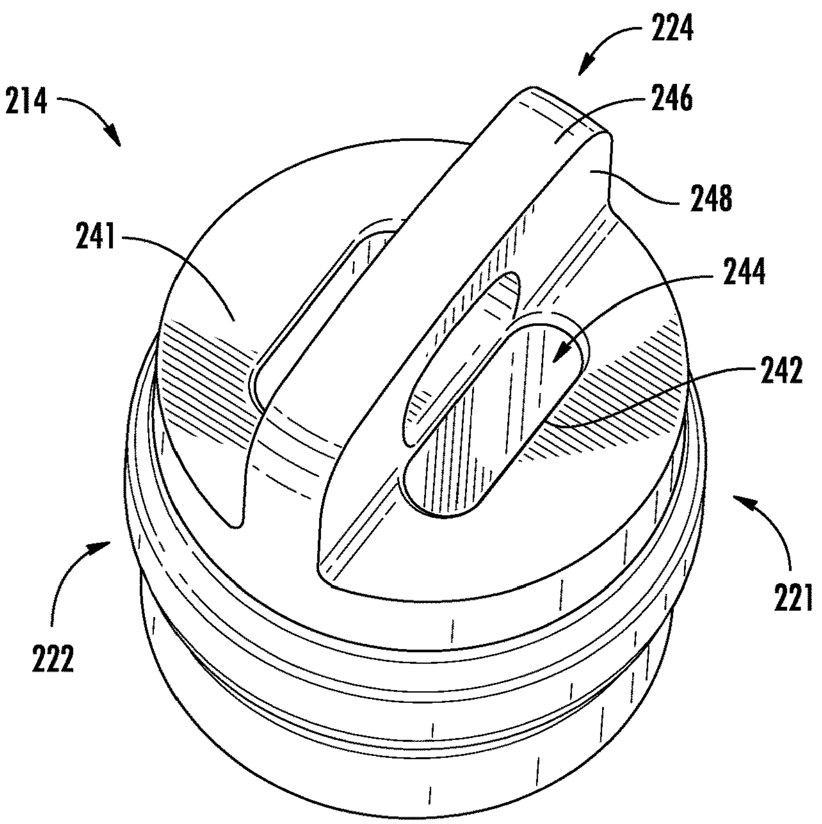
FIG. 16 is a detailed perspective view of a second portion of the socket holder of FIG. 13, according to an exemplary embodiment.

Referring to FIG. 12, a top view of socket holder 110 is shown. An upper surface 146 of a generally vertical wall 124 of collar 114 has a width W2. In a specific embodiment, W2 is specifically between 55% and 65% of H2, more specifically between 58% and 62% of H2 and in such embodiments W2 is about 0.098 inches (e.g. 0.098 inches plus or minus 0.01 inches). A head 130 includes an outer surface 154 defining an outer diameter D3. An outer surface 132 of generally horizontal disc 122 of collar 114 defines an outer diameter D4. In various embodiments, D3 is between 75% and 95% of D4, specifically between 80% and 90% of D4 and more specifically between 83% and 87% of D4. In a specific embodiment, D3 is between 84% and 86% of D4 and in such embodiments D4 is about 0.438 in (e.g., 0.438 inches plus or minus 0.0625 inches).

Referring to FIGS. 13-18, various aspects of a socket holder, shown as a socket holder 210, are shown. In general, socket holder 210 is substantially the same as socket holder 10 and socket holder 110 except for the differences discussed herein. Collar 214 includes a base portion, shown as a generally horizontal disc 221 and a generally vertical wall 224 extending away from generally horizontal disc 221 in a direction parallel to axis 234. Generally horizontal disc 221 includes a main retention ring 222 with an outer surface 232, a lower body region 233 and an upper body region 235. The main retention ring 222 has a different diameter than the outer diameters of both the upper body 235 and lower body regions 233 of generally horizontal disc 221. Applicant believes the addition of the extra surface material increases the longevity of the second portion or collar 214 by allowing more area for the second material to flex and/or flow when it is compressed. The overall thickness of the ring or disc component is increased while the working area of the ring that allows for radial engagement with the socket is effectively the same size relative to the previously described embodiments.

Figure 17:
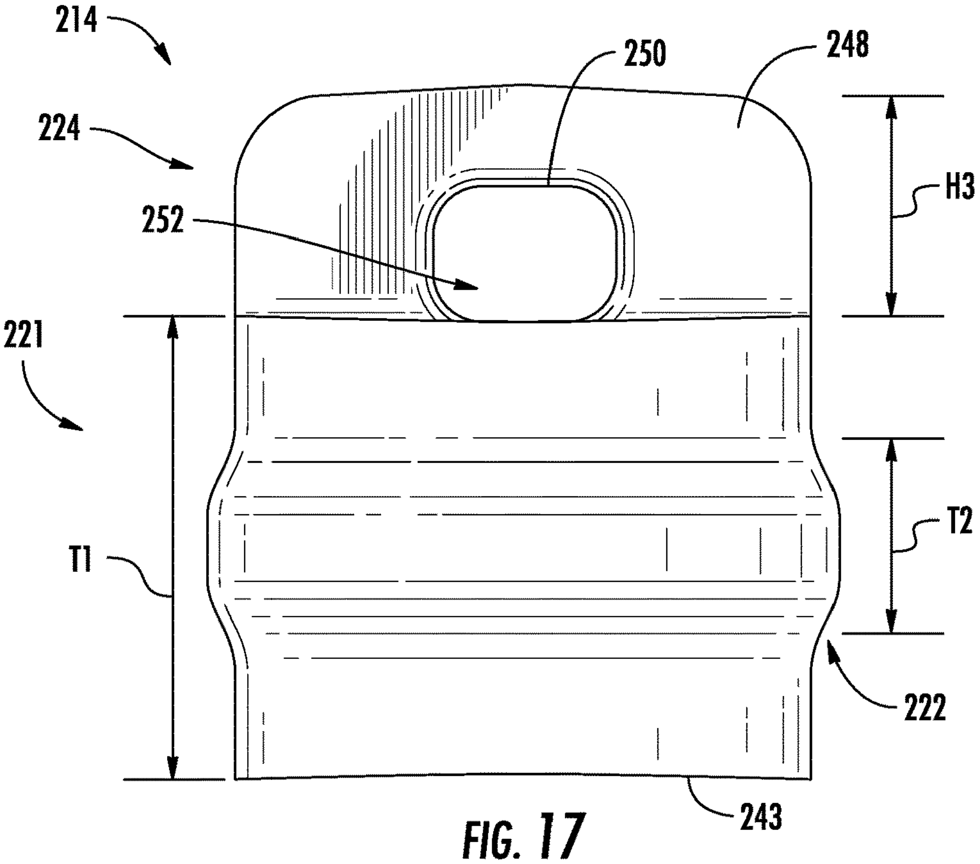
FIG. 17 is a detailed side view of the second portion of the socket holder of FIG. 16, according to an exemplary embodiment.

Referring to FIG. 17, a side surface 248 of a generally vertical wall 224 of collar 214 has a height H3. A total thickness, T1 of generally horizontal disc 221 is defined between an upper or upward facing surface 241 and a lower or downward facing surface 243 of generally horizontal disc 221. Main retention ring 222 includes a ring thickness T2. In a specific embodiment, T2 is between 30% and 50% of T1, specifically between 35% and 45% of T1, more specifically between 38% and 42% of T1 and in such embodiments T2 is about 0.08 inches (e.g., 0.08 inches plus or minus 0.01 inches).

Figure 18:
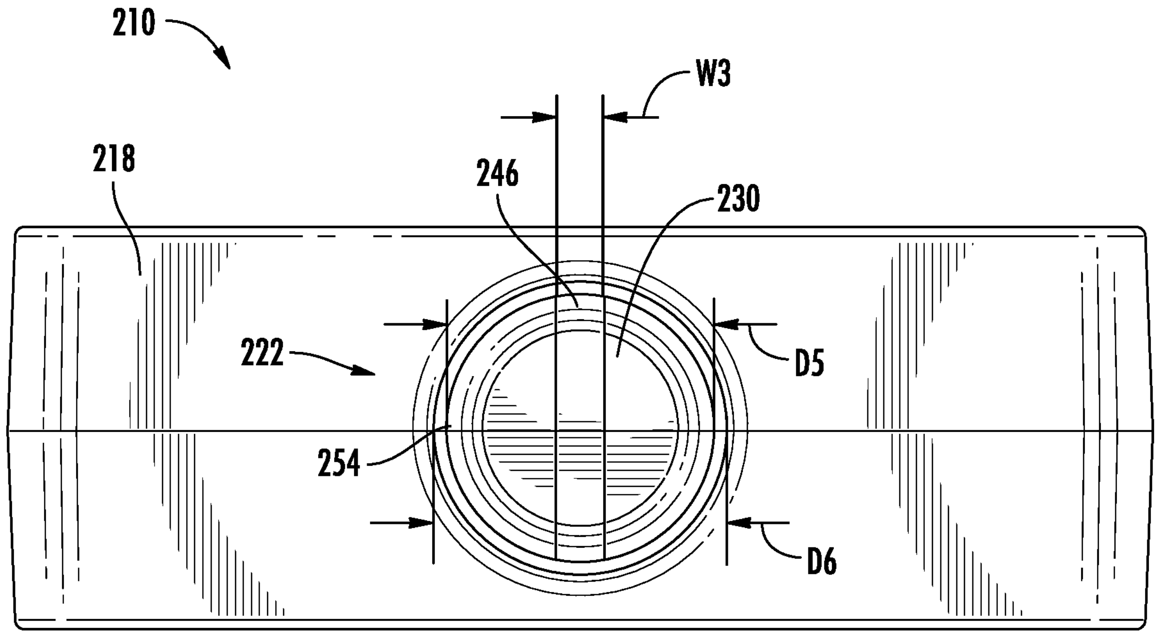
FIG. 18 is a top view of the socket holder of FIG. 13, according to an exemplary embodiment.
Figure 19:
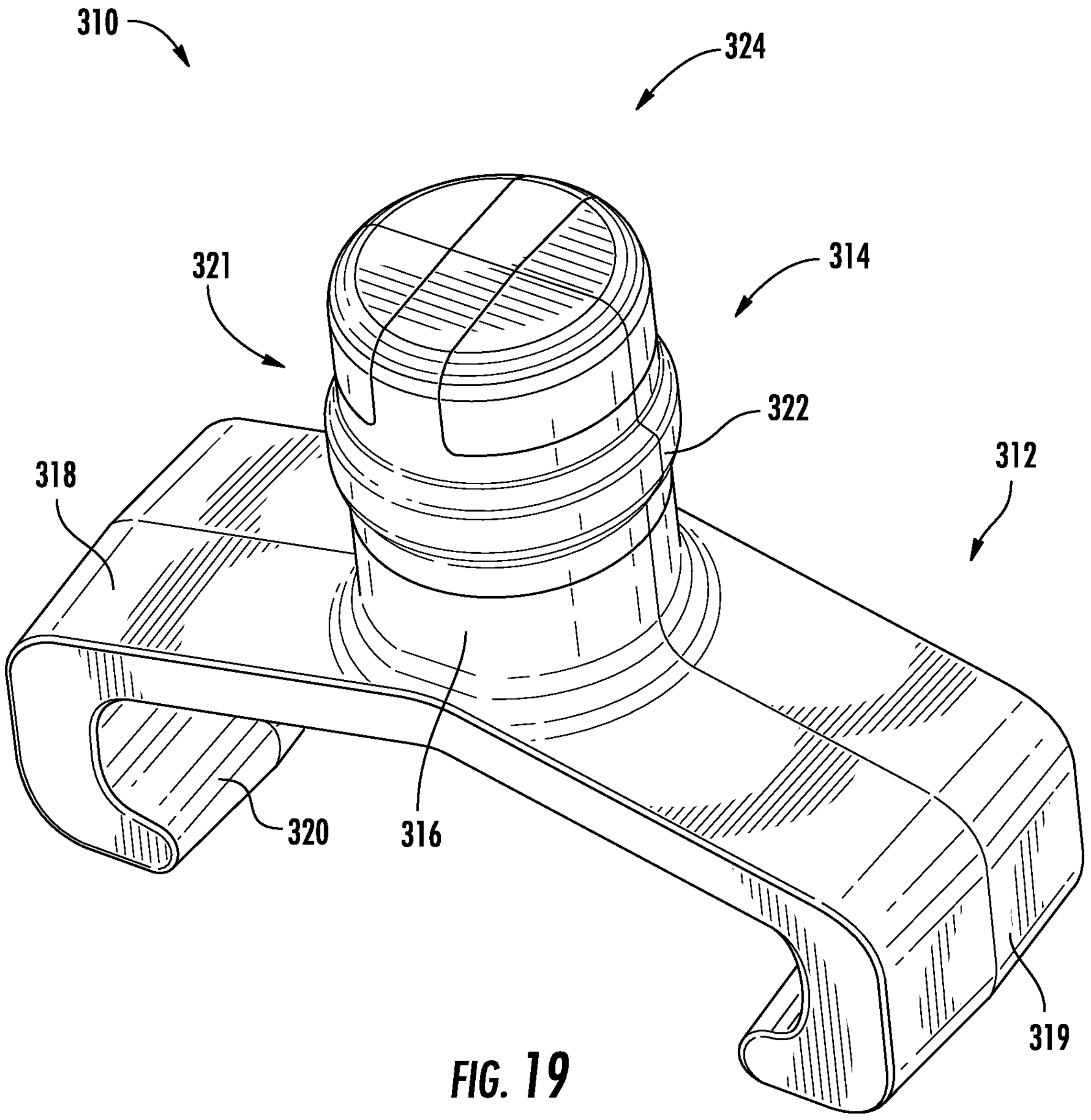
FIG. 19 is a perspective view of a socket holder, according to another exemplary embodiment.
Figure 20:
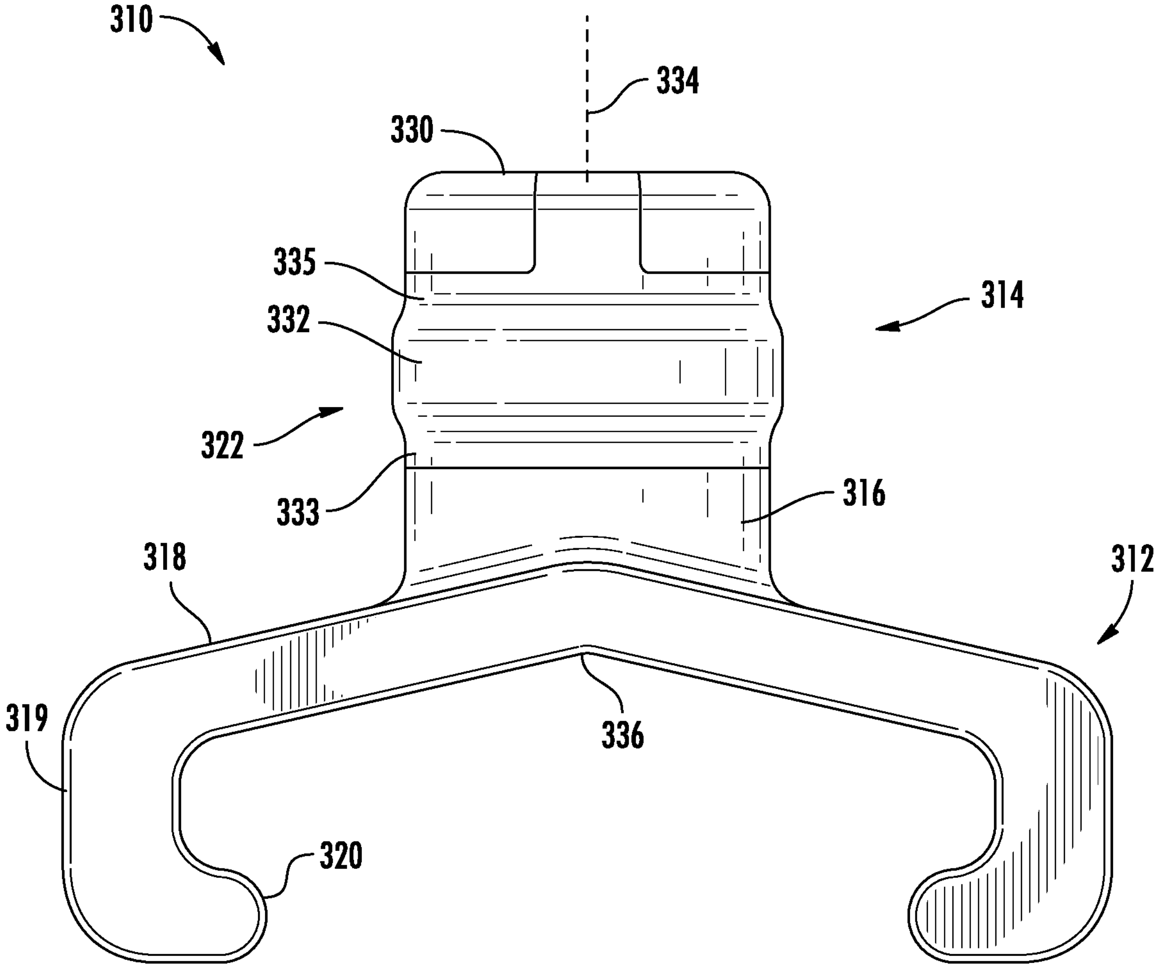
FIG. 20 is a front view of the socket holder of FIG. 19, according to an exemplary embodiment.
Figure 21:
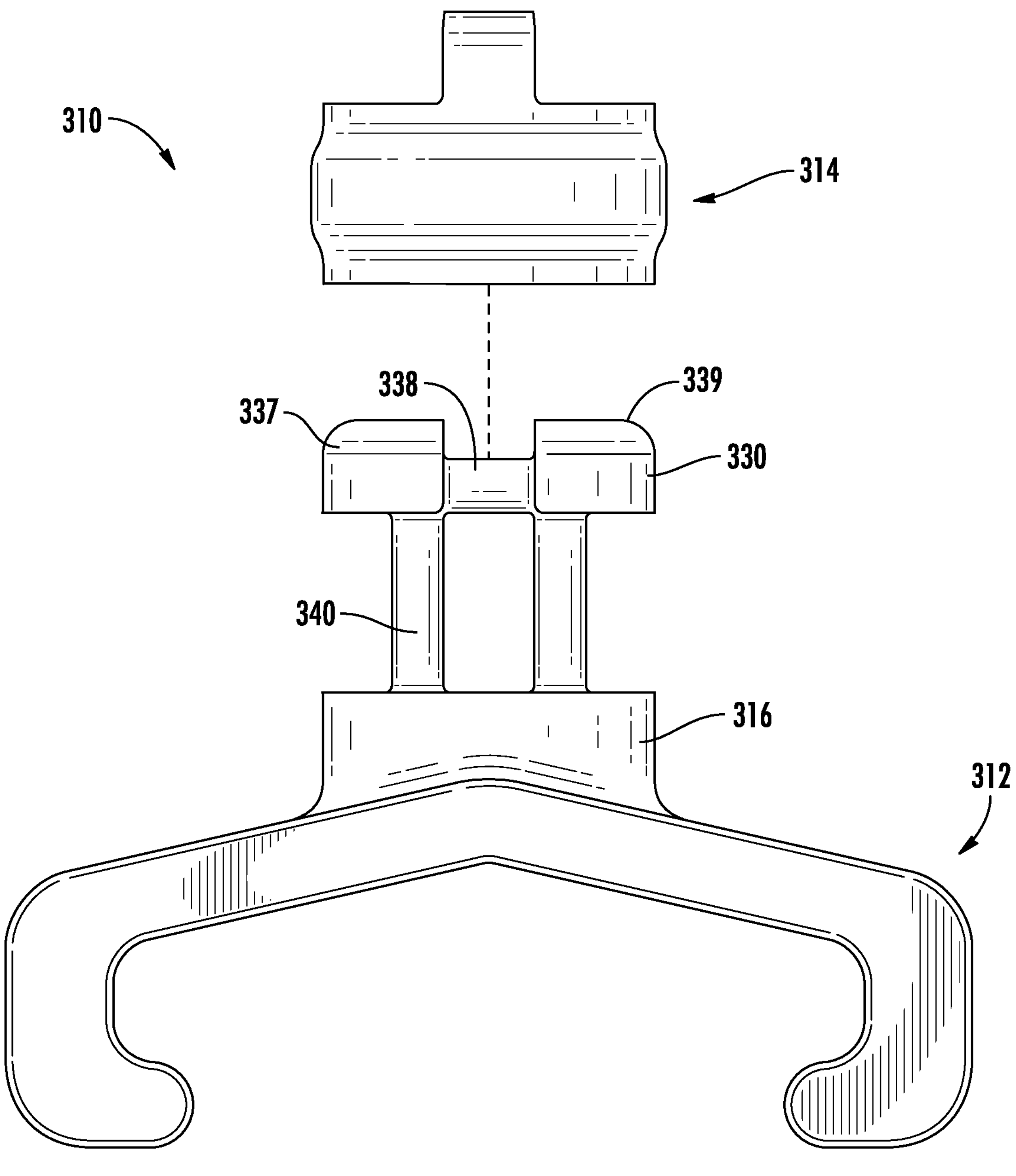
FIG. 21 is an exploded view of the socket holder of FIG. 19, according to an exemplary embodiment.
Figure 22:
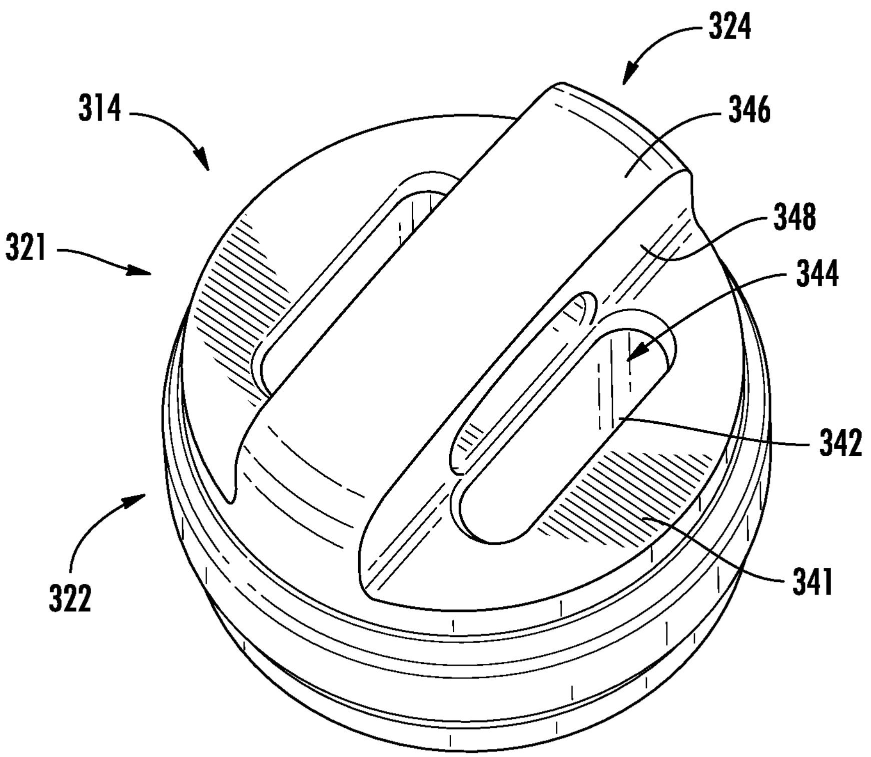
FIG. 22 is a detailed perspective view of a second portion of the socket holder of FIG. 19, according to an exemplary embodiment.

Referring to FIG. 18, a top view of socket holder 210 is shown. An upper surface 246 of a generally vertical wall 124 of collar 214 extends away from the side surface 248 of generally vertical wall 224 in a generally perpendicular direction (i.e., 90 degrees±10 degrees) and has a width W3. In a specific embodiment, W3 is specifically between 35% and 45% of H3, more specifically between 37% and 41% of H3 and in such embodiments W3 is about 0.039 inches (e.g., 0.039 inches plus or minus 0.01 inches). A head 230 includes an outer surface 254 defining an outer diameter D5. An outer surface 232 of main retention ring 222 of collar 214 defines an outer diameter D6. In various embodiments, D5 is between 75% and 95% of D6, specifically between 85% and 95% of D6 and more specifically between 89% and 93% of D6. In a specific embodiment, D5 is between 90% and 92% of D6 and in such embodiments D6 is about 0.276 in (e.g., 0.276 inches plus or minus 0.0625 inches).

Figure 23:
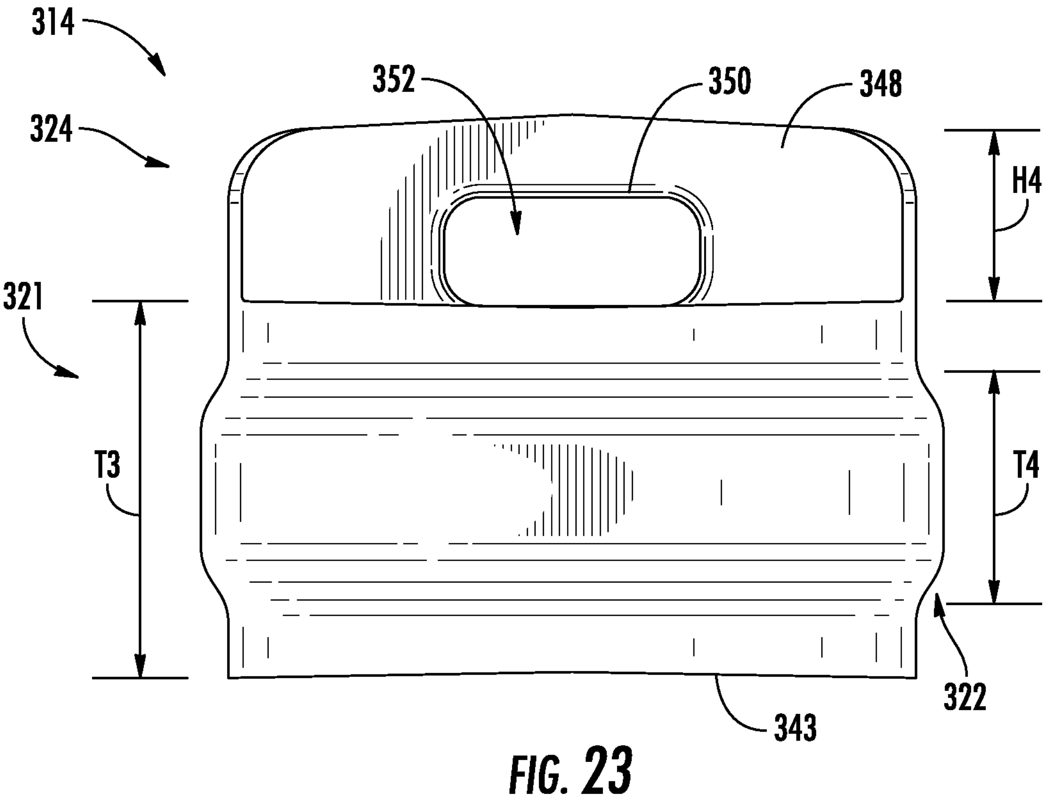
FIG. 23 is a detailed side view of the second portion of the socket holder of FIG. 22, according to an exemplary embodiment.

Referring to FIGS. 19-24, various aspects of a socket holder, shown as a socket holder 310, are shown. In general, socket holder 310 is substantially the same as socket holder 210 except for the differences discussed herein. Referring to FIG. 23, a side surface 348 of a generally vertical wall 324 of collar 314 has a height H4. A total thickness, T3 of generally horizontal disc 321 is defined between an upper surface 341 and a lower surface 343 of generally horizontal disc 321. Main retention ring 322 includes a ring thickness T4. In a specific embodiment, T4 is between 50% and 70% of T3, specifically between 55% and 65% of T3, more specifically between 58% and 62% of T3 and in such embodiments T4 is about 0.12 inches (e.g., 0.12 inches plus or minus 0.02 inches).

Figure 24:
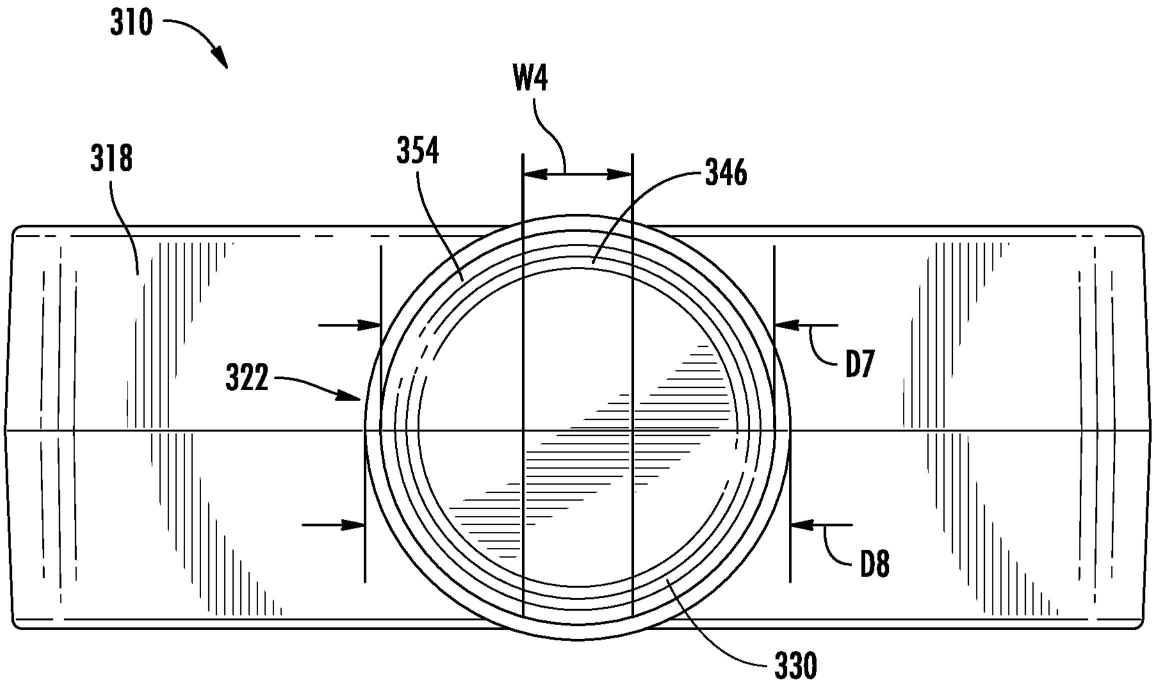
FIG. 24 is a top view of the socket holder of FIG. 19, according to an exemplary embodiment.

Referring to FIG. 24, a top view of socket holder 310 is shown. An upper surface 346 of a generally vertical wall 324 of collar 314 has a width W4. In a specific embodiment, W4 is specifically between 88% and 98% of H4, more specifically between 93% and 97% of H4 and in such embodiments W4 is about 0.098 inches (e.g., 0.098 inches plus or minus 0.01 inches). A head 330 includes an outer surface 354 defining an outer diameter D7. An outer surface 332 of main retention ring 322 of collar 314 defines an outer diameter D8. In various embodiments, D7 is between 75% and 95% of D8, specifically between 85% and 95% of D8 and more specifically between 89% and 93% of D8. In a specific embodiment, D7 is between 91% and 93% of D8 and in such embodiments D8 is about 0.4 in (e.g., 0.4 inches plus or minus 0.0625 inches).

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed:

1. A socket holder comprising:

an integral body portion comprising:

a base component including first and second opposing ends;

a neck coupled to and extending away from an upper side of the base component;

a pair of side components, each one coupled to one of the first and second opposing ends of the base component, respectively and extending away from a lower side of the base component in a direction opposite of the neck;

a head coupled to an upper end of the neck, the head defining an uppermost surface of the socket holder;

a longitudinal axis extending through the head; and a pair of protrusions each one extending inward from a lower end of one of the side components toward the longitudinal axis;

a collar comprising:

a generally horizontal disc; and a generally vertical wall extending away from generally horizontal disc in a direction parallel to the longitudinal axis;

wherein the collar is a separate component, non-integral with the body portion and positioned around at least a portion of the head of the body portion such that portions of the generally horizontal disc protrude outward away from the head and are configured to engage with an inner surface of a socket such that the socket is held on the socket holder.

2. The socket holder of claim 1, wherein the generally horizontal disc includes:

a lower body region;

an upper body region; and a main retention ring positioned between the lower body region and the upper body region, the main retention ring including an outer surface.

3. The socket holder of claim 2, wherein the outer surface of the main retention ring engages with the inner surface of the socket such that the socket is held on the socket holder.

4. The socket holder of claim 2, wherein the outer surface of the main retention ring defines a first diameter and an outer surface of the head defines a second diameter, and wherein the first diameter is greater than the second diameter.

5. The socket holder of claim 4, wherein the second diameter is between 85% and 95% of the first diameter.

6. The socket holder of claim 2, wherein a thickness of the generally horizontal disc is defined between an upward facing surface and a downward facing surface of the generally horizontal disc and wherein the main retention ring includes a ring thickness such that ring the thickness is at least 50% of an outward facing surface material of the generally horizontal disc.

7. The socket holder of claim 6, wherein the ring thickness is between 50% and 70% of the thickness of the generally horizontal disc.

8. The socket holder of claim 1, wherein the body portion is formed from a first material and the collar is formed from a second material.

9. The socket holder of claim 8, wherein the first material is harder than the second material.

10. A socket holder comprising:

a body portion comprising:

a rail engagement base;

a neck coupled to and extending away from the rail engagement base;

a head coupled to the neck; and a longitudinal axis extending through the head; and a collar comprising:

a generally horizontal disc including:

a lower body region;

an upper body region; and a main retention ring positioned between the lower body region and the upper body region, the main retention ring including an outer surface, wherein the main retention ring extends radially outward beyond the lower body region and the upper body region; and a generally vertical wall extending away from generally horizontal disc in a direction parallel to the longitudinal axis;

wherein the body portion is formed from a first material and the collar is formed from a second material different from the first material.

11. The socket holder of claim 10, wherein the first material is a polymer material having a first durometer and the second material is polymer material having a second durometer, the second durometer is less than the first durometer.

12. The socket holder of claim 10, wherein the collar is coupled to the head via a friction fit between the collar and an outer surface of the head.

13. The socket holder of claim 10, wherein the rail engagement base includes:

a base component;

a pair of side components coupled to the base component and extending away from the base component in a direction opposite of the neck; and a pair of protrusions each one extending inward from one of the side components toward the longitudinal axis.

14. The socket holder of claim 10, wherein the outer surface of the main retention ring engages with an inner surface of a socket such that the socket is held on the socket holder.

15. The socket holder of claim 14, wherein a thickness of the generally horizontal disc is defined between an upward facing surface and a downward facing surface of the generally horizontal disc and wherein the main retention ring includes a ring thickness such that ring the thickness is at least 30% of an outward facing surface material of the generally horizontal disc.

16. The socket holder of claim 15, wherein the ring thickness is between 30% and 50% of the thickness of the generally horizontal disc.

17. A socket holder comprising:

a body comprising:

a base component;

a neck coupled to and extending away from the base component;

a pair of side components coupled to the base component and extending away from the base component in a direction opposite of the neck;

a head coupled to the neck;

a longitudinal axis extending through the head; and a pair of protrusions each one extending inward from one of the side components toward the longitudinal axis;

a collar comprising:

a generally horizontal disc, the general horizontal disc including:

a lower body region;

an upper body region; and a main retention ring positioned between the lower body region and the upper body region, the main retention ring including an outer surface, wherein the main retention ring extends radially outward beyond the lower body region and the upper body region; and a generally vertical wall extending away from generally horizontal disc in a direction parallel to the longitudinal axis.

18. The socket holder of claim 17, wherein the outer surface of the main retention ring engages with an inner surface of a socket such that the socket is held on the socket holder.

19. The socket holder of claim 17, wherein the generally vertical wall of the collar further includes:

a side surface of generally vertical wall extending away from generally horizontal disc in a direction parallel to the longitudinal axis, the side surface having a height; and an upper surface of generally vertical wall extending away from the side surface of generally vertical wall in a perpendicular direction, the upper surface having a width.

20. The socket holder of claim 19, wherein the width of the upper surface of generally vertical wall is between 35% and 45% of the height of the side surface of generally vertical wall.

* * * * *